US012680003B2

(12) United States Patent (10) Patent No.: US 12,680,003 B2
Fujii et al. (45) Date of Patent: Jul. 14, 2026

(54) REINFORCEMENT MATERIAL AND REINFORCEMENT STRUCTURE

(71) Applicant: NITTO DENKO CORPORATION, Osaka (JP)

(72) Inventors: Takahiro Fujii, Osaka (JP); Masahaya Sugimoto, Osaka (JP); Takuya Mase, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/550,255

(22) PCT Filed: Jan. 27, 2022

(86) PCT No.: PCT/JP2022/002980
§ 371 (c)(1),
(2) Date: Sep. 12, 2023

(87) PCT Pub. No.: WO2022/201838
PCT Pub. Date: Sep. 29, 2022

(65) Prior Publication Data
US 2024/0158672 A1 May 16, 2024

(30) Foreign Application Priority Data
Mar. 26, 2021 (JP) ................................. 2021-054332

(51) Int. Cl.
*B32B 5/02* (2006.01)
*B32B 5/18* (2006.01)
(Continued)

(52) U.S. Cl.
CPC *C09J 7/35* (2018.01); *B32B 5/02* (2013.01); *B32B 5/18* (2013.01); *B32B 5/245* (2013.01);
(Continued)

(58) Field of Classification Search
None
See application file for complete search history.

(56) References Cited

U.S. PATENT DOCUMENTS

2005/0025955 A1 2/2005 Kuriu et al.
2005/0103422 A1 5/2005 Kawaguchi
(Continued)

FOREIGN PATENT DOCUMENTS

CN 1699472 A 11/2005
CN 101427291 A 5/2009
(Continued)

OTHER PUBLICATIONS

Machine translation of JP 2018-030246 A via J-PlatPat. (Year: 2018).*
(Continued)

*Primary Examiner* — Elizabeth Collister
(74) *Attorney, Agent, or Firm* — Edwards Neils LLC; Jean C. Edwards, Esq.

(57) ABSTRACT

A reinforcement material includes a resin layer and a restraining layer. The resin layer contains a resin component and a foaming agent, and serves as a reinforcement layer for reinforcing an object. The restraining layer is disposed on the resin layer. The reinforcement layer contains a matrix resin obtained by curing the resin component and a plurality of cells generated by foaming the foaming agent. A ratio of the total area of the plurality of cells in a cross section of the reinforcement layer is 83% or more, and an elastic modulus of the matrix resin of the reinforcement layer is 1.4 GPa or more.

3 Claims, 2 Drawing Sheets

10

(51) Int. Cl.

| | |
|---|---|
| *B32B 5/24* | (2006.01) |
| *B32B 15/14* | (2006.01) |
| *B32B 15/18* | (2006.01) |
| *C09J 7/35* | (2018.01) |

(52) U.S. Cl.
CPC .............. *B32B 15/14* (2013.01); *B32B 15/18* (2013.01); *B32B 2260/021* (2013.01); *B32B 2260/046* (2013.01); *B32B 2262/101* (2013.01); *B32B 2264/104* (2013.01); *B32B 2266/0207* (2013.01); *B32B 2266/0271* (2013.01); *B32B 2307/4026* (2013.01); *B32B 2307/748* (2013.01); *C09J 2301/408* (2020.08); *C09J 2301/414* (2020.08); *C09J 2400/24* (2013.01); *C09J 2409/00* (2013.01); *C09J 2463/00* (2013.01); *C09J 2495/00* (2013.01)

(56) References Cited

U.S. PATENT DOCUMENTS

| | | | | |
|---|---|---|---|---|
| 2009/0091878 | A1* | 4/2009 | Kawaguchi ....... | G02F 1/133308 |
| | | | | 361/679.01 |
| 2010/0196689 | A1 | 8/2010 | Fujii et al. | |
| 2013/0216843 | A1 | 8/2013 | Mase et al. | |
| 2020/0282703 | A1 | 9/2020 | Fuke et al. | |
| 2020/0282704 | A1 | 9/2020 | Fuke et al. | |
| 2020/0346430 | A1 | 11/2020 | Fujii et al. | |
| 2023/0035852 | A1 | 2/2023 | Suzuki et al. | |

FOREIGN PATENT DOCUMENTS

| | | |
|---|---|---|
| CN | 101798440 A | 8/2010 |
| CN | 111148630 A | 5/2020 |
| JP | 2005-022339 A | 1/2005 |
| JP | 2005-041210 A | 2/2005 |
| JP | 2005-139218 A | 6/2005 |
| JP | 2011-148091 A | 8/2011 |
| JP | 2012-076279 A | 4/2012 |
| JP | 2018-030246 A | 3/2018 |
| JP | 2020-090070 A | 6/2020 |
| JP | 2021-027111 A | 2/2021 |
| JP | 2021-107126 A | 7/2021 |
| WO | 2007/125815 A1 | 11/2007 |
| WO | 2019/088009 A1 | 5/2019 |

OTHER PUBLICATIONS

International Preliminary Report on Patentability issued by WIPO on Sep. 12, 2023, in connection with International Patent Application No. PCT/JP2022/002980.

International Search Report issued in PCT/JP2022/002980 on Apr. 12, 2022.

Written Opinion issued in PCT/JP2022/002980 on Apr. 12, 2022.

Extended European Search Report, issued by the European Patent Office on Mar. 3, 2025, in connection with European Patent Application No. 22774640.1.

Office Action, issued by the Japanese Patent Office on Apr. 30, 2025, in connection with Japanese Patent Application No. 2021-054332.

Office Action, issued by the Japanese Patent Office on Dec. 10, 2024, in connection with Japanese Patent Application No. 2021-054332.

Office Action, issued by the State Intellectual Property Office of China on Jul. 29, 2025, in connection with Chinese Patent Application No. 202280018985.3.

* cited by examiner

10

REINFORCEMENT MATERIAL AND REINFORCEMENT STRUCTURE

CROSS-REFERENCE TO RELATED APPLICATIONS

The present application is a 35 U.S.C. 371 National Stage Entry of PCT/JP2022/002980, filed on Jan. 27, 2022, which claims priority from Japanese Patent Application No. 2021-054332, filed on Mar. 26, 2021, the contents of all of which are herein incorporated by reference in their entirety.

TECHNICAL FIELD

The present invention relates to a reinforcement material and a reinforcement structure.

BACKGROUND ART

Conventionally, a reinforcement material (reinforcement sheet) including a restraining layer and a reinforcement layer has been known. The reinforcement layer contains at least a styrene-butadiene-based rubber, an epoxy resin, and a foaming agent (ref: for example, Patent Document 1).

CITATION LIST

Patent Document

Patent Document 1: Japanese Unexamined Patent Publication No. 2005-41210

SUMMARY OF THE INVENTION

Problem to be Solved by the Invention

Further improvement in reinforcement performance has been required in the reinforcement material described in the above-described Patent Document 1.

The present invention provides a reinforcement material and a reinforcement structure capable of achieving improvement in reinforcement performance.

Means for Solving the Problem

The present invention [1] includes a reinforcement material for reinforcing an object including a resin layer containing a resin component and a foaming agent and becoming a reinforcement layer for reinforcing the object, and a restraining layer disposed on the resin layer, wherein the reinforcement layer contains a matrix resin obtained by curing the resin component and a plurality of cells generated by foaming the foaming agent, a ratio of the total area of the plurality of cells in a cross section of the reinforcement layer is 83% or more, and an elastic modulus of the matrix resin of the reinforcement layer is 1.4 GPa or more.

The present invention [2] includes the reinforcement material of the above-described [1], wherein the resin component contains a thermosetting resin and a rubber, and a ratio of the thermosetting resin with respect to 100 parts by mass of the rubber is more than 100 parts by mass.

The present invention [3] includes the reinforcement material of the above-described [2], wherein the thermosetting resin contains a flexible epoxy resin and an epoxy resin other than the flexible epoxy resin, and a ratio of the flexible epoxy resin in the thermosetting resin is 10% by mass or more and below 50% by mass.

The present invention [4] includes the reinforcement material of the above-described [3], wherein the rubber contains an acrylonitrile-butadiene rubber, and a ratio of the acrylonitrile-butadiene rubber with respect to 100 parts by mass of the flexible epoxy resin is 60 parts by mass or more.

The present invention [5] includes a reinforcement structure including an object and a reinforcement member having the reinforcement layer and the restraining layer of the above-described [1].

Effect of the Invention

According to the reinforcement material and the reinforcement structure of the present invention, it is possible to achieve improvement in reinforcement performance.

BRIEF DESCRIPTION OF THE DRAWINGS

FIG. 2A illustrating an attachment step of attaching the reinforcement material to the object and FIG. 2B illustrating a curing step of foaming and curing the object to which the reinforcement material is attached.

DESCRIPTION OF EMBODIMENTS

1. Reinforcement Material 1

Figure 1:
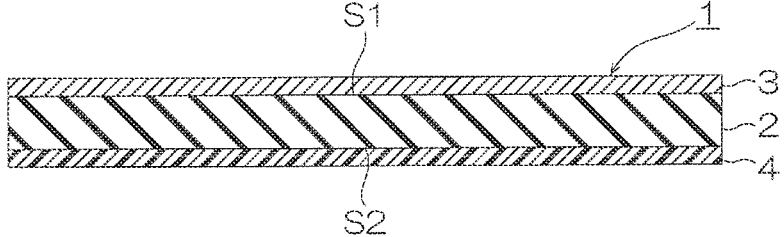
FIG. 1 shows a cross-sectional view of a reinforcement material as one embodiment of the present invention.

A reinforcement material 1 shown in FIG. 1 is a member for reinforcing an object P (ref: FIG. 2B). Examples of the object P include metal panels such as aluminum plates, stainless steel plates, iron plates, copper plates, zinc plates, and brass plates. The metal panel can be used for, for example, transportation equipment such as automobiles, railway vehicles, ships, and airplanes, and, for example, buildings. Preferably, the reinforcement material 1 is a reinforcement sheet. The reinforcement material 1 includes a resin layer 2 and a restraining layer 3. The reinforcement material 1 includes a release sheet 4 as needed.

(1) Resin Layer 2

The resin layer 2 has a predetermined thickness. In a thickness direction of the resin layer 2, the resin layer 2 has a first surface S1 and a second surface S2.

A thickness of the resin layer 2 is, for example, 0.1 mm or more, preferably 0.2 mm or more, and for example, 10 mm or less, preferably 5 mm or less.

When the resin layer 2 foams and cures in a state where the reinforcement material 1 is attached to the object P, the resin layer 2 becomes a reinforcement layer 5 (ref: FIG. 2B). The reinforcement layer 5 is described later. The resin layer 2 contains a resin component and a foaming agent. The resin layer 2 contains a vulcanizing agent, a vulcanization accelerator, a thermosetting resin curing agent, and another additive as needed.

(1-1) Resin Component

The resin component preferably contains a thermosetting resin and a rubber. The resin component contains a tackifier as needed.

The viscosity of the resin component at a decomposition temperature of the foaming agent is, for example, 500 Pa·s or more, preferably 1000 Pa·s or more, and for example, 4000 Pa·s or less, preferably 3500 Pa·s or less. The decomposition temperature of the foaming agent is described later.

(1-1-1) Thermosetting Resin

The thermosetting resin preferably contains a flexible epoxy resin and an epoxy resin other than the flexible epoxy resin. The thermosetting resin more preferably consists of only a flexible epoxy resin and an epoxy resin other than the flexible epoxy resin. In the following description, the epoxy resin other than the flexible epoxy resin is described as another epoxy resin.

The flexible epoxy resin has higher flexibility than a bisphenol A-type epoxy resin. Preferably, the flexible epoxy resin has higher flexibility after curing than an aromatic epoxy resin to be described later. More preferably, the flexible epoxy resin has higher flexibility after curing than another epoxy resin to be described later.

The flexible epoxy resin does not contain a cyclic structure in its main chain, or contains fewer cyclic structures than the other epoxy resin to be described later. Examples of the cyclic structure include aromatic rings, aliphatic hydrocarbon rings, and nitrogen-containing rings. Preferably, the flexible epoxy resin has a flexible component in its main chain. Examples of the flexible component include long-chain aliphatic hydrocarbon components, rubber components, and polyol components. An example of the long-chain aliphatic hydrocarbon component includes an alkylene group derived from a dimer acid of the long-chain unsaturated fatty acid. An example of the long-chain unsaturated fatty acid includes an unsaturated fatty acid having 12 or more carbon atoms. Examples of the unsaturated fatty acid having 12 or more carbon atoms include linoleic acids.

An epoxy equivalent of the flexible epoxy resin is, for example, 220 g/eq or more, preferably 300 g/eq or more, more preferably 500 g/eq or more. When the epoxy equivalent is the above-described lower limit value or more, it is possible to improve flexibility of a reinforcement member 11 (ref. FIG. 2B). The reinforcement member 11 is described later.

Further, the epoxy equivalent of the flexible epoxy resin is, for example, 2000 g/eq or less, preferably 1200 g/eq or less, more preferably 1000 g/eq or less, more preferably 800 g/eq or less. When the epoxy equivalent is the above-described upper limit value or less, it is possible to suppress an excessive reduction in reinforcement performance of the reinforcement member 11.

In the present embodiment, the reinforcement performance of the reinforcement member 11 is evaluated by 1-mm bending strength. The 1-mm bending strength is measured by a method described in Examples to be described later.

Examples of the flexible epoxy resin include aliphatic modified epoxy resins, ε-caprolactone-modified epoxy resins, thiol-based epoxy resins, rubber-modified epoxy resins, dimer acid-modified epoxy resins, urethane-modified epoxy resins, polyol-modified epoxy resins, and amine-modified epoxy resins. Examples of the rubber-modified epoxy resin include butadiene-based epoxy resins. Examples of the butadiene-based epoxy resin include acrylonitrile-butadiene rubber-modified epoxy resins, carboxyl group-terminated acrylonitrile-butadiene rubber-modified epoxy resins, and amino group-terminated acrylonitrile-butadiene rubber-modified epoxy resins.

As the flexible epoxy resin, from the viewpoint of compatibility with the rubber and adhesion of the resin layer 2, preferably, an aliphatic modified epoxy resin, a rubber-modified epoxy resin, and a dimer acid-modified epoxy resin are used, more preferably, a dimer acid-modified epoxy resin is used. The resin layer 2 may contain a plurality kinds of flexible epoxy resins.

Examples of a commercially available product of the flexible epoxy resin include jER (registered trademark) series (manufactured by Mitsubishi Chemical Corporation) and YD series (manufactured by NIPPON STEEL Chemical & Material Co., Ltd.). Examples of the flexible epoxy resin of the jER series include jER871, jER872, and jER872X75. An example of the flexible epoxy resin of the YD series includes YD-172.

Examples of the other epoxy resin include aromatic epoxy resins, alicyclic epoxy resins, and nitrogen-containing ring epoxy resins.

Examples of the aromatic epoxy resin include bisphenol-type epoxy resins, novolac-type epoxy resins, naphthalene-type epoxy resins, and biphenyl-type epoxy resins.

Examples of the bisphenol-type epoxy resin include bisphenol A-type epoxy resins, bisphenol F-type epoxy resins, and bisphenol S-type epoxy resins.

Examples of the novolac-type epoxy resin include phenol novolac-type epoxy resins and cresol novolac-type epoxy resins.

Examples of the alicyclic epoxy resin include dicyclo ring-type epoxy resins and hydrogenated bisphenol A-type epoxy resins.

Examples of the nitrogen-containing ring epoxy resin include triglycidyl isocyanurate, hydantoin epoxy resins, and triepoxy propyl isocyanurate resins.

The epoxy equivalent of the other epoxy resin is smaller than the epoxy equivalent of the flexible epoxy resin. The epoxy equivalent of the other epoxy resin is, for example, below 220 g/eq. preferably 200 g/eq or less, and for example, 150 g/eq or more, preferably 160 g/eq or more.

A ratio of the thermosetting resin in the resin layer 2 is, for example, 10% by mass or more, preferably 15% by mass or more, and for example, 50% by mass or less, preferably 30% by mass or less.

The ratio of the thermosetting resin in the resin component is, for example, 30% by mass or more, preferably 40% by mass or more, and for example, 80% by mass or less, preferably 60% by mass or less.

The ratio of the thermosetting resin with respect to 100 parts by mass of the rubber is, for example, above 100 parts by mass, preferably 150 parts by mass or more. When the ratio of the thermosetting resin with respect to the rubber is the above-described lower limit value or more, it is possible to achieve improvement in the reinforcement performance of the reinforcement material 1.

The ratio of the thermosetting resin with respect to 100 parts by mass of the rubber is, for example, 300 parts by mass or less, preferably 200 parts by mass or less. When the ratio of the thermosetting resin with respect to the rubber is the above-described upper limit value or less, it is possible to achieve the improvement in the reinforcement performance of the reinforcement material 1.

The ratio of the flexible epoxy resin in the thermosetting resin is, for example, 10% by mass or more, preferably 20% by mass or more, and for example, below 50% by mass, preferably 45% by mass or less, more preferably 40% by mass or less. When the ratio of the flexible epoxy resin in the thermosetting resin is the above-described lower limit value or more and below the above-described upper limit value, it is possible to further achieve the improvement in the reinforcement performance of the reinforcement material 1.

(1-1-2) Rubber

Examples of the rubber include diene-based rubbers. Examples of the diene-based rubber include styrene-butadiene rubbers (SBR), acrylonitrile-butadiene rubbers (NBR), isoprene rubbers, and butadiene rubbers.

As the rubber, preferably, a styrene-butadiene rubber and an acrylonitile-butadiene rubber are used. The rubber preferably contains the acrylonitrile-butadiene rubber. The rubber more preferably contains the styrene-butadiene rubber and the acrylonitrile-butadiene rubber.

The ratio of the rubber in the resin layer 2 is, for example, 3% by mass or more, preferably 8% by mass or more, and for example, 40% by mass or less, preferably 20% by mass or less.

The ratio of the rubber in the resin component is, for example, 20% by mass or more, preferably 25% by mass or more, and for example, 40% by mass or less, preferably 35% by mass or less.

When the thermosetting resin contains the flexible epoxy resin and the rubber contains the acrylonitrile-butadiene rubber, the ratio of the acrylonitrile-butadiene rubber with respect to 100 parts by mass of the flexible epoxy resin is, for example, 60 parts by mass or more, preferably 100 parts by mass or more. When the ratio of the acrylonitrile-butadiene rubber with respect to the flexible epoxy resin is the above-described lower limit value or more, it is possible to achieve the improvement in the reinforcement performance of the reinforcement material 1.

The ratio of the acrylonitrile-butadiene rubber with respect to 100 parts by mass of the flexible epoxy resin is, for example, 150 parts by mass or less, preferably 130 parts by mass or less. When the ratio of the acrylonitrile-butadiene rubber with respect to the flexible epoxy resin is the above-described upper limit value or less, it is possible to achieve the improvement in the reinforcement performance of the reinforcement material 1.

When the rubber contains the styrene-butadiene rubber and the acrylonitrile-butadiene rubber, the ratio of the acrylonitrile-butadiene rubber with respect to 100 parts by mass of the styrene-butadiene rubber is, for example, 40 parts by mass or more, preferably 60 parts by mass or more, more preferably 75 parts by mass or more. When the ratio of the acrylonitrile-butadiene rubber with respect to the styrene-butadiene rubber is the above-described lower limit value or more, it is possible to achieve the improvement in the reinforcement performance of the reinforcement material 1.

The ratio of the acrylonitrile-butadiene rubber with respect to 100 parts by mass of the styrene-butadiene rubber is, for example, below 100 parts by mass, preferably 80 parts by mass or less. When the ratio of the acrylonitrile-butadiene rubber with respect to the styrene-butadiene rubber is the above-described upper limit value or less, it is possible to achieve the improvement in the reinforcement performance of the reinforcement material 1.

(1-1-3) Tackifier Resin

A tackifier resin imparts pressure-sensitive adhesiveness to the resin layer 2.

The tackifier resin is classified into, for example, a natural resin-based tackifier resin and a synthetic resin-based tackifier resin.

Examples of the natural resin-based tackifier resin include rosin-based resins, aromatic modified terpene resins, and terpene-based resins. Examples of the rosin-based resin include rosin esters. Examples of the terpene-based resin include terpene phenol resins.

Examples of the synthetic resin-based tackifier resin include aliphatic petroleum resins, aromatic petroleum resins, and aliphatic aromatic copolymer-based petroleum resins. In the following description, the aliphatic petroleum resin is referred to as a C5 petroleum resin, the aromatic petroleum resin is referred to as a C9 petroleum resin, and the aliphatic aromatic copolymer-based petroleum resin is referred to as a C5/C9 petroleum resin.

The C5 petroleum resin mainly contains a structural unit derived from an aliphatic hydrocarbon having 5 carbon atoms. Examples of the aliphatic hydrocarbon having 5 carbon atoms include isoprene and piperylene. The C5 petroleum resin is produced by polymerizing a mixture of the aliphatic hydrocarbon having 5 carbon atoms by-produced by thermal decomposition of naphtha. In the following description, the mixture of the aliphatic hydrocarbon having 5 carbon atoms by-produced by the thermal decomposition of the naphtha is referred to as a C5 fraction.

The C9 petroleum resin mainly contains a structural unit derived from an aromatic hydrocarbon having 9 carbon atoms. Examples of the aromatic hydrocarbon having 9 carbon atoms include styrene, vinyltoluene, and indene. The C9 petroleum resin is produced by polymerizing a mixture of the aromatic hydrocarbon having 9 carbon atoms by-produced by the thermal decomposition of the naphtha. In the following description, the mixture of the aromatic hydrocarbon having 9 carbon atoms by-produced by the thermal decomposition of the naphtha is referred to as a C9 fraction.

The C5/C9 petroleum resin mainly contains the structural unit derived from the aliphatic hydrocarbon having 5 carbon atoms and the structural unit derived from the aromatic hydrocarbon having 9 carbon atoms. The C5/C9 petroleum resin is produced by polymerizing the C5 fraction and the C9 fraction.

As the tackifier resin, preferably, a synthetic resin-based tackifier resin is used, more preferably, a C5/C9 petroleum resin is used.

The ratio of the tackifier resin in the resin layer 2 is, for example, 1% by mass or more, preferably 5% by mass or more, and for example, 15% by mass or less, preferably 10% by mass or less.

The ratio of the tackifier resin in the resin component is, for example, 10% by mass or more, preferably 15% by mass or more, and for example, 30% by mass or less, preferably 25% by mass or less.

The ratio of the tackifier resin with respect to 100 parts by mass of the thermosetting resin is, for example, 20 parts by mass or more, preferably 40 parts by mass or more, and for example, 70 parts by mass or less, preferably 60 parts by mass or less.

The ratio of the tackifier resin with respect to 100 parts by mass of the rubber is, for example, 50 parts by mass or more, preferably 70 parts by mass or more, and for example, 150 parts by mass or less, preferably 100 parts by mass or less.

(1-2) Foaming Agent

The foaming agent foams by heating. When the resin layer 2 contains the foaming agent, it is possible to increase the strength of the reinforcement member 11 (ref: FIG. 2B) by increasing the thickness of the reinforcement layer 5 (ref: FIG. 2B).

The foaming agent is classified into, for example, an inorganic foaming agent and an organic foaming agent.

Examples of the inorganic foaming agent include ammonium carbonate (decomposition temperature: 58° C.), ammonium bicarbonate (decomposition temperature: 35° C. to 60° C.), sodium bicarbonate (decomposition temperature: 140° C. to 170° C.), ammonium nitrite (decomposition temperature: 210° C.), and azides.

Examples of the organic foaming agent include N-nitroso-based compounds, azo-based compounds, alkane fluoride, hydrazine-based compounds, semicarbazide-based compounds, and triazole-based compounds. An example of the N-nitroso-based compound includes N,N'-dinitrosopentam-ethylenetetramine (decomposition temperature: 205° C.). An example of the azo-based compound includes azobisisobu-tyronitrile (decomposition temperature: about 50° C.). An example of the hydrazine-based compound include 4,4'-oxybis(benzenesulfonyl hydrazide) (decomposition tem-perature: 155° C. to 165° C.). An example of the semicar-bazide-based compound includes p-toluylenesulfonyl semicarbazide. An example of the triazole-based compound includes 5-morpholyl-1,2,3,4-thiatriazole.

The decomposition temperature of the foaming agent is preferably 80° C. or more, more preferably 100° C. or more, and preferably 300° C. or less, more preferably 200° C. or less.

As the foaming agent, preferably, an organic foaming agent is used, more preferably, a hydrazine-based compound is used, further more preferably, a 4,4'-oxybis(benzenesulfo-nyl hydrazide) (OBSH) is used.

The ratio of the foaming agent in the resin layer 2 is, for example, 0.1% by mass or more, preferably 0.5% by mass or more, and for example, 2% by mass or less, preferably 1% by mass or less.

The ratio of the foaming agent with respect to 100 parts by mass of the resin component is, for example, 1 part by mass or more, preferably 1.5 parts by mass or more, and for example, 3 parts by mass or less, preferably 2 parts by mass or less.

(1-3) Vulcanizing Agent

The vulcanizing agent cross-links (vulcanizes) the diene-based rubber by heating.

Examples of the vulcanizing agent include sulfur, sulfur compounds, and organic peroxides. As the vulcanizing agent, preferably, sulfur is used.

A mixing ratio of the vulcanizing agent with respect to 100 parts by mass of the diene-based rubber is, for example, 2 parts by mass or more, preferably 10 parts by mass or more, more preferably 20 parts by mass or more, further more preferably 40 parts by mass or more, and for example, 80 parts by mass or less, preferably 70 parts by mass or less, more preferably 60 parts by mass or less.

(1-4) Vulcanization Accelerator

The vulcanization accelerator accelerates vulcanization by the vulcanizing agent.

Examples of the vulcanization accelerator include thiaz-ole-based vulcanization accelerators, thiourea-based vulca-nization accelerators, thiuram-based vulcanization accelera-tors, dithiocarbamate-based vulcanization accelerators, guanidine-based vulcanization accelerators, aldehyde-am-monia-based vulcanization accelerators, and sulfenamide-based vulcanization accelerators. As the vulcanization accel-erator, preferably, a thiazole-based vulcanization accelerator is used.

The mixing ratio of the vulcanization accelerator with respect to 100 parts by mass of the vulcanizing agent is, for example, 10 parts by mass or more, preferably 30 parts by mass or more, and for example, 100 parts by mass or less, preferably 70 parts by mass or less.

(1-5) Thermosetting Resin Curing Agent

The thermosetting resin curing agent accelerates curing of the thermosetting resin.

Examples of the thermosetting resin curing agent include cyanamide, amine, acid anhydride, amide, hydrazide, imi-dazole, and imidazoline.

An example of the cyanamide includes dicyandiamide.

Examples of the amine include ethylenediamine, propyl-enediamine, diethylenetriamine, triethylenetetramine, amine adducts of these, metaphenylenediamine, diaminodiphenyl-methane, and diaminodiphenyl sulfone.

Examples of the acid anhydride include phthalic anhy-dride, maleic anhydride, tetrahydrophthalic anhydride, hexahydrophthalic anhydride, methylnadic anhydride, pyromellitic anhydride, dodecenyl succinic anhydride, dichlorosuccinic anhydride, benzophenone tetracarboxylic anhydride, and chlorendic anhydride.

An example of the amide includes polyamide.

An example of the hydrazide includes dihydrazide.

Examples of the imidazole include methylimidazole, 2-ethyl-4-methylimidazole, ethylimidazole, isopropylimida-zole, 2,4-dimethylimidazole, phenylimidazole, undecylimi-dazole, heptadecylimidazole, and 2-phenyl-4-methylimida-zole.

Examples of the imidazoline include methylimidazoline, 2-ethyl-4-methylimidazoline, ethylimidazoline, isopropy-limidazoline, 2,4-dimethylimidazoline, phenylimidazoline, undecylimidazoline, heptadecylimidazoline, and 2-phenyl-4-methylimidazoline.

The ratio of the thermosetting resin curing agent with respect to 100 parts by mass of the thermosetting resin is, for example, 1 part by mass or more, preferably 3 parts by mass or more, and for example, 10 parts by mass or less, prefer-ably 7 parts by mass or less.

(1-6) Another Additive

The resin layer 2 may further contain another additive. Examples of the other additive include fillers and pigments.

Examples of the filler include calcium carbonate, talc, and organic bentonite.

The ratio of the filler with respect to 100 parts by mass of the resin component is, for example, 50 parts by mass or more, preferably 110 parts by mass or more, and for example, 300 parts by mass or less, preferably 200 parts by mass or less.

Examples of the pigment include carbon black and zinc oxide.

The ratio of the pigment with respect to 100 parts by mass of the resin component is, for example, 1 part by mass or more, preferably 3 parts by mass or more, and for example, 10 parts by mass or less, preferably 7 parts by mass or less.

(2) Restraining Layer 3

The restraining layer 3 is disposed on the first surface S1 of the resin layer 2. The restraining layer 3 restrains the reinforcement layer 5 to be described later. The restraining layer 3 restrains the reinforcement layer 5, so that the toughness of the reinforcement layer 5 is improved. The restraining layer 3 has a predetermined thickness in the thickness direction of the resin layer 2.

The thickness of the restraining layer 3 is, for example, 0.01 mm or more, preferably 0.05 mm or more, and for example, 3 mm or less, preferably 1 mm or less.

Examples of a material for the restraining layer 3 include metals and glass fibers. Examples of the metal include aluminum and copper. As the metal, preferably, aluminum is used. As the glass fiber, preferably, a resin-impregnated glass cloth is used.

(3) Release Sheet 4

The release sheet 4 is disposed on the second surface S2 of the resin layer 2. The release sheet 4 protects the resin layer 2 in a state of being disposed on the second surface S2 of the resin layer 2. The release sheet 4 is peelable from the resin layer 2. As the release sheet 4, for example, a known release paper or the like may be used.

2. Reinforcement Method

Next, a reinforcement method of the object P by the reinforcement material 1 is described.

Figure 2A:
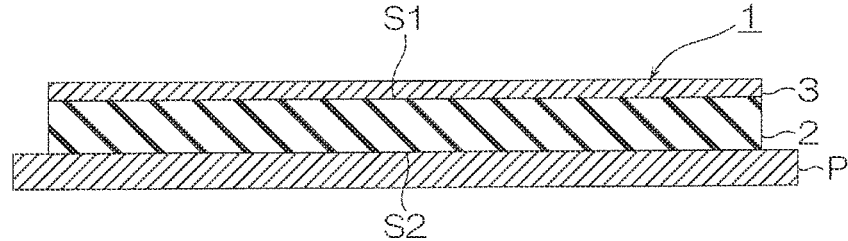
FIGS. 2A and 2B show explanatory views for illustrating a reinforcement method for reinforcing an object with the reinforcement material shown in FIG. 1.
Figure 2B:
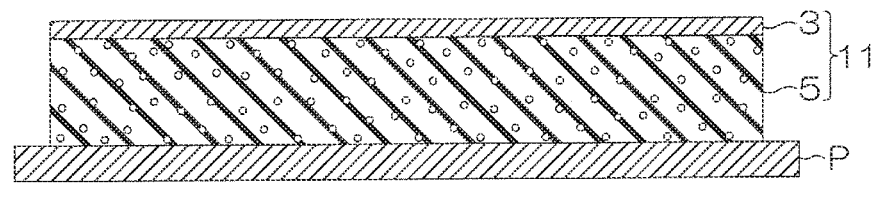

As shown in FIGS. 2A and 2B, the reinforcement method includes an attachment step (ref: FIG. 2A) of attaching the reinforcement material 1 to the object P and a curing step (ref FIG. 2B) of thermally curing the resin layer 2 in a state where the reinforcement material 1 is attached to the object P.

As shown in FIG. 2A, in the attachment step, an operator peels the release sheet 4 from the resin layer 2 to bring the second surface S2 of the resin layer 2 into contact with the object P. The reinforcement material 1 is attached to the object P by the pressure-sensitive adhesive force of the resin layer 2.

Next, in the curing step, the operator heats the object P to which the reinforcement material 1 is attached.

A heating temperature is, for example, the decomposition temperature of the foaming agent or more. The heating temperature is, for example, a temperature lower than or equal to the temperature that is 100° C. higher than the decomposition temperature of the foaming agent.

When the foaming agent is OBSH, the heating temperature is, for example, 130° C. or more, preferably 150° C. or more, and for example, 265° C. or less, preferably 220° C. or less.

The heating time is, for example, 5 minutes or more, preferably 10 minutes or more, and for example, 60 minutes or less, preferably 30 minutes or less.

In the curing step, as shown in FIGS. 2A and 2B, the resin layer 2 foams and cures.

Specifically, in the curing step, the resin component in the resin layer 2 is softened by heating. As described above, the viscosity of the softened resin component is, for example, 500 Pa·s or more, preferably 1000 Pa·s or more, and for example, 4000 Pa·s or less, preferably 3500 Pa·s or less at the decomposition temperature of the foaming agent.

The foaming agent is decomposed in a state where the resin component is softened, so that the resin layer 2 foams. The resin component cures in a state where the resin layer 2 foams, so that the resin layer 2 cures. When the curing of the resin layer 2 is completed, the resin layer 2 becomes the reinforcement layer 5. In other words, the reinforcement layer 5 is a cured product of the resin layer 2. The reinforcement layer 5 is fixed to the object P.

Figure 3:
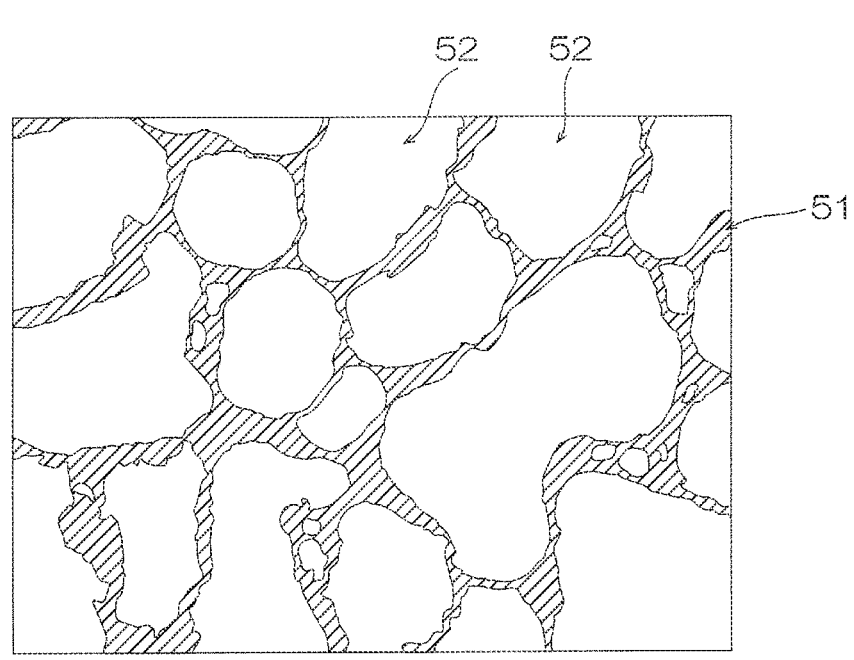
FIG. 3 shows an enlarged view of a cross section of the reinforcement layer shown in FIG. 2B.

As shown in FIG. 3, the reinforcement layer 5 contains a matrix resin 51 obtained by curing a resin component and a plurality of cells 52 generated by foaming a foaming agent.

The ratio (vacancy) of the total area of the plurality of cells 52 in a cross section of the reinforcement layer 5 is 83% or more. The ratio of the total area of the plurality of cells 52 in the cross section of the reinforcement layer 5 is measured by the method described in Examples to be described later. The ratio of the total area of the plurality of cells 52 in the cross section of the reinforcement layer 5 can be adjusted by the viscosity of the softened resin component and the ratio of the foaming agent in the resin layer 2.

The ratio of the total area of the plurality of cells 52 in the cross section of the reinforcement layer 5 is preferably 83% or more, and for example, 90% or less, preferably 88% or less.

When the ratio of the total area of the plurality of cells 52 in the cross section of the reinforcement layer 5 is the above-described lower limit value or more, it is possible to increase the thickness of the reinforcement layer 5.

A foaming ratio (thickness of the reinforcement layer 5/thickness of the resin layer 2) of the resin layer 2 is, for example, 3 times or more, and for example, 5 times or less.

An average diameter of the plurality of cells 52 is, for example, 100 μm or more, preferably 200 μm or more, and for example, 2000 μm or less, preferably 1000 μm or less. When the ratio of the total area of the plurality of cells 52 in the cross section of the reinforcement layer 5 is the same, the average diameter of the plurality of cells 52 affects the breaking strength of the reinforcement member 11. However, the bending of the reinforcement member 11 is small as for the 1-mm bending elasticity, the average diameter of the plurality of cells 52 hardly affects the 1-mm bending elasticity.

Also, an elastic modulus of the matrix resin 51 of the reinforcement layer 5 is 1.4 GPa or more. The elastic modulus of the matrix resin 51 of the reinforcement layer 5 can be adjusted by the ratio of the thermosetting resin with respect to the rubber.

The elastic modulus of the matrix resin 51 of the reinforcement layer 5 is, for example, 5.0 GPa or less, preferably 4.5 GPa or less.

When the ratio of the resin component in the resin layer 2 is the same, the higher the elastic modulus of the matrix resin 51 of the reinforcement layer 5 and the higher the ratio of the total area of the plurality of cells 52 in the cross section of the reinforcement layer 5, the higher the 1-mm bending elasticity.

Therefore, when the elastic modulus of the matrix resin 51 of the reinforcement layer 5 is set at 1.4 GPa or more, and the ratio of the total area of the plurality cells 52 in the cross section of the reinforcement layer 5 is set at 83% or more, it is possible to achieve the improvement in the reinforcement performance of the reinforcement member 11.

By completing the curing step, as shown in FIG. 2B, a reinforcement structure 10 is formed. The reinforcement structure 10 includes the object P and the reinforcement member 11. The reinforcement member 11 includes the reinforcement layer 5 and the restraining layer 3. The reinforcement member 11 reinforces the object P. The reinforcement layer 5 is disposed on the object P. The reinforcement layer 5 reinforces the object P. The restraining layer 3 is disposed on the reinforcement layer 5. The restraining layer 3 is disposed on the opposite side of the object P with respect to the reinforcement layer 5 in the thickness direction of the reinforcement layer 5.

3. Function and Effect

According to the reinforcement material 1, as shown in FIG. 2B, the reinforcement layer 5 obtained by foaming and curing the resin layer 2 has the elastic modulus of the matrix resin 51 of the reinforcement layer 5 of 1.4 GPa or more, and the ratio of the total area of the plurality of cells 52 in the cross section of the reinforcement layer 5 is 83% or more.

Therefore, it is possible to achieve the improvement in the reinforcement performance of the reinforcement material 1.

EXAMPLES

Next, the present invention is further described based on Examples and Comparative Examples. The present invention is however not limited by these Examples below. The specific numerical values in property value and parameter used in the following description can be replaced with upper limit values (numerical values defined as "or less") or lower limit values (numerical values defined as "or more") of corresponding numerical values in property value and parameter described in the above-described "DESCRIPTION OF EMBODIMENTS".

(1) Fabrication of Resin Layer

As for each Example and Comparative Example, a resin composition was prepared by mixing materials shown in Tables 1 and 2.

The obtained resin composition was rolled to have a thickness of 0.4 mm with a press molding machine, thereby fabricating the resin layer. A resin-impregnated glass cloth having a thickness of 0.2 mm as a restraining layer was attached onto one surface of the obtained resin layer, and a release paper was attached onto the other surface of the resin layer (surface at the opposite side to one surface). Thus, the reinforcement material was obtained.

TABLE 1

| | | Ex. 1 | Ex. 2 | Ex. 3 | Ex. 4 | Ex. 5 |
|---|---|---|---|---|---|---|
| Rubber | SBR | 20 | 20 | 20 | 20 | 20 |
| (parts by mass) | NBR | 20 | 20 | 20 | 20 | 20 |
| Thermosetting | Epoxy Resin | 60 | 68 | 53 | 70 | 50 |
| Resin | Flexible | 20 | 22 | 17 | 10 | 30 |
| (parts by mass) | Epoxy Resin | | | | | |
| Tackifier Resin | Tackifier Resin | 30 | 30 | 30 | 30 | 30 |
| (parts by mass) | | | | | | |
| Filler | Heavy Calcium | 200 | 200 | 200 | 200 | 200 |
| (parts by mass) | Carbonate | | | | | |
| Pigment | Carbon Black | 3 | 3 | 3 | 3 | 3 |
| (parts by mass) | | | | | | |
| Vulcanizing Agent | Sulfur | 20 | 20 | 20 | 20 | 20 |
| (parts by mass) | | | | | | |
| Vulcanization Accelerator (parts by mass) | | 10 | 10 | 10 | 10 | 10 |
| Epoxy Resin Curing Agent (parts by mass) | | 5 | 5 | 5 | 5 | 5 |
| Foaming Agent (parts by mass) | | 2 | 2 | 2 | 2 | 2 |
| Ratio of Flexible Epoxy in Thermosetting Resin (% by mass) | | 25 | 24 | 24 | 13 | 38 |
| NBR/Flexible Epoxy | | 1.0 | 0.9 | 1.2 | 2.0 | 0.7 |
| Ratio of Foaming Agent in Resin Layer (% by mass) | | 0.6 | 0.6 | 0.6 | 0.6 | 0.6 |
| Foaming Ratio | | 3.2 | 3.4 | 3.2 | 3.3 | 3.3 |
| 1-mm Bending Strength (N) | | 31 | 31 | 34 | 33 | 31 |
| Elastic Modulus of Base Resin (GPa) | | 2.1 | 2.6 | 3.4 | 2.9 | 3.5 |
| Porosity (%) | | 84 | 85 | 83 | 83 | 83 |

TABLE 2

| | | Comparative Ex. 1 | Comparative Ex. 2 |
|---|---|---|---|
| Rubber | SBR | 20 | 20 |
| (parts by mass) | NBR | 20 | 20 |
| Thermosetting Resin | Epoxy Resin | 50 | 15 |
| (parts by mass) | Flexible Epoxy Resin | | 55 |
| Tackifier Resin | Tackifier Resin | 30 | 30 |
| (parts by mass) | | | |
| Filler (parts by mass) | Calcium Carbonate | 200 | 200 |
| Pigment | Carbon Black | 3 | 3 |
| (parts by mass) | | | |
| Vulcanizing Agent | Sulfur | 20 | 20 |
| (parts by mass) | | | |
| Vulcanization Accelerator (parts by mass) | | 10 | 10 |
| Epoxy Resin Curing Agent (parts by mass) | | 5 | 5 |
| Foaming Agent (parts by mass) | | 2 | 2 |
| Ratio of Flexible Epoxy in Thermosetting Resin (% by mass) | | 0 | 79 |
| NBR/Flexible Epoxy | | | 0.4 |

TABLE 2-continued

| | Comparative Ex. 1 | Comparative Ex. 2 |
|---|---|---|
| Ratio of Foaming Agent in Resin Layer (% by mass) | 0.6 | 0.6 |
| Foaming Ratio | 2.0 | 2.8 |
| 1-mm Bending Strength (N) | 19 | 24 |
| Elastic Modulus of Base Resin (GPa) | 0.8 | 3.2 |
| Porosity (%) | 79 | 78 |

In the following, materials in Tables 1 and 2 are described.

SBR: styrene-butadiene rubber (trade name: Tufdene 2003, manufactured by Asahi Kasei Chemicals)

NBR: acrylonitrile-butadiene rubber (trade name: Nipol1052J, manufactured by Zeon Corporation)

Epoxy resin: bisphenol A-type epoxy resin (trade name: jER-828, manufactured by Mitsubishi Chemical Corporation, epoxy equivalent: 190 g/eq)

Flexible epoxy resin: dimer acid-modified epoxy resin (trade name: YD-172, manufactured by NIPPON STEEL Chemical & Material Co., Ltd., epoxy equivalent: 650 g/eq)

Tackifier resin 1: C5/C9 petroleum resin (trade name: Petrotack 90HM, manufactured by TOSOH CORPORATION)

Heavy calcium carbonate (manufactured by Maruo Calcium Co., Ltd.)

Carbon black (trade name: Asahi #50, manufactured by ASAHI CARBON CO., LTD.)

Sulfur (trade name: GOLDEN FLOWER SULFUR POWDER, manufactured by Tsurumi Chemical Industry Co., Ltd.)

Vulcanization accelerator (trade name: DM, manufactured by OUCHI SHINKO CHEMICAL INDUSTRIAL CO., LTD.)

Epoxy resin curing agent (thermosetting resin curing agent): dicyandiamide (manufactured by NIPPON CARBIDE INDUSTRIES CO., INC.)

Foaming agent: 4,4'-oxybis(benzenesulfonyl hydrazide) (trade name: Neocellbom N #1000S, manufactured by EIWA CHEMICAL IND CO., LTD.)

(2) Measurement of Porosity

Each of the reinforcement materials of Examples and Comparative Examples was attached to the entire surface of a cold rolling steel plate (manufactured by Nippon Testpanel Co., Ltd., SPCC-SD, width: 25 mm, length: 150 mm, thickness of 0.8 mm) as an object by peeling the release paper.

Then, the steel plate to which the reinforcement material was attached was heated at 180° C. for 20 minutes. Thus, the resin layer foamed and cured, thereby obtaining a reinforcement member (reinforcement member including the reinforcement layer as a cured product of the resin layer and the restraining layer) on the steel plate.

The obtained reinforcement member was peeled from the steel plate, and the cross section of the reinforcement layer was magnified by 100 times with a microscope to be observed.

In a cross-sectional image (3000 μm×3000 μm) obtained by the microscope, the ratio of the total area of the plurality of cells in the cross section of the reinforcement layer was calculated by the following formula. The results are shown in Tables 1 and 2.

Formula: porosity=total area of plurality of cells/ total area of reinforcement layer in cross-sectional image×100

(3) Measurement of Elastic Modulus of Base Resin

The reinforcement member was obtained on the steel plate under the same conditions as the measurement of the porosity. The obtained reinforcement member was peeled from the steel plate, and the elastic modulus of the matrix resin of the reinforcement layer was measured with a nanoindenter (testing machine: manufactured by Triboindenter, manufactured by Hysitron Inc.).

The elastic modulus was calculated based on an inclination from 20% to 85% of an unloading curve by pressing the matrix resin of the reinforcement layer at a maximum load of 11000 $\mu$N using a Berkovich indenter. The results are shown in Tables 1 and 2.

(4) Measurement of 1-Mm Bending Strength

The reinforcement member was obtained on the steel plate under the same conditions as the measurement of the porosity.

A test piece including the steel plate and the reinforcement member was supported by a testing machine (tensile compressive testing machine: Technograph TG-5KN, manufactured by MinebeaMitsumi Inc.) at an interval of 100 mm in a state where the steel plate faced upward, and a test bar was lowered at a rate of 1 mm/min from above with respect to the center in a longitudinal direction of the test piece.

The bending strength (N) when the test bar dropped by 1 mm after the test bar was brought into contact with the steel plate was referred to as the 1-mm bending strength. The results are shown in Tables 1 and 2.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The reinforcement material and the reinforcement structure of the present invention are used for reinforcing metal panels used for, for example, transportation equipment such as automobiles, railway vehicles, ships, and airplanes, and for example, buildings.

DESCRIPTION OF REFERENCE NUMERALS

1 Reinforcement material
2 Resin layer

3 Restraining layer
5 Reinforcement layer
51 Matrix resin
52 Cell
10 Reinforcement structure
11 Reinforcement member
P Object

The invention claimed is:

1. A reinforcement material for reinforcing an object comprising:
   a resin layer containing a resin component and a foaming agent and becoming a reinforcement layer for reinforcing the object, and
   a restraining layer disposed on the resin layer, wherein
      the resin component contains a thermosetting resin and a rubber,
      a ratio of the thermosetting resin with respect to 100 parts by mass of the rubber is more than 100 parts by mass,
      the thermosetting resin contains a flexible epoxy resin and an epoxy resin other than the flexible epoxy resin,
      a ratio of the flexible epoxy resin in the thermosetting resin is 10% by mass or more and 45% by mass or less,
      the rubber contains an acrylonitrile-butadiene rubber,
      a ratio of the acrylonitrile-butadiene rubber with respect to 100 parts by mass of the flexible epoxy resin is 60 parts by mass or more,
      the reinforcement layer contains a matrix resin obtained by curing the resin component and a plurality of cells generated by foaming the foaming agent,
      a ratio of the total area of the plurality of cells in a cross section of the reinforcement layer is 83% or more, and
      an elastic modulus of the matrix resin of the reinforcement layer is 1.4 GPa or more.

2. A reinforcement structure comprising:
   an object and
   a reinforcement member having the reinforcement layer and the restraining layer according to claim 1.

3. The reinforcement material according to claim 1, wherein the ratio of the flexible epoxy resin in the thermosetting resin is 40% by mass or less.

* * * * *